United States Patent [19]

Peterson

[11] Patent Number: 4,739,663

[45] Date of Patent: Apr. 26, 1988

[54] ACOUSTICALLY MONITORED MANOMETER

[75] Inventor: Paul E. Peterson, San Mateo, Calif.

[73] Assignee: Western Atlas International, Inc., Houston, Tex.

[21] Appl. No.: 6,104

[22] Filed: Jan. 23, 1987

[51] Int. Cl.[4] ............................................. G01L 11/00
[52] U.S. Cl. .......................................... 73/703; 73/749
[58] Field of Search ................. 73/703, 749, 747, 748, 73/750, 4 R

[56] References Cited

U.S. PATENT DOCUMENTS 3,008,332 11/1961 Charbonnier et al. ................ 73/703
3,589,196 6/1971 Van Dyck ............................. 73/703
4,552,011 11/1985 Wiley .................................... 73/703

FOREIGN PATENT DOCUMENTS 0587339 1/1978 U.S.S.R. ............................... 73/749

Primary Examiner—Donald O. Woodiel
Attorney, Agent, or Firm—Barry C. Kane

[57] ABSTRACT

A U-tube manometer for calibrating a differential pressure transducer or the like, wherein the height of working fluid in each column may be determined by the two-way travel time of an acoustic pulse launched from the top of each column against the top of the working fluid. The propagation velocity of each acoustic pulse is determined by a calibration target integral with each tube and located above the working fluid at a predetermined distance from each acoustic source. The generation and detection of each acoustic pulse is monitored by a remote processor and recorder which calculates the pressure differential between the two tubes of the manometer.

14 Claims, 2 Drawing Sheets

ACOUSTICALLY MONITORED MANOMETER

BACKGROUND OF THE INVENTION

1. Field of the Invention

The instant invention relates to a device used to measure or produce a differential pressure between two reference points and particularly to a device which experiences static pressures on the order of $1.0 \times 10^4$ pounds per square inch (psi) yet which is capable of measuring differential pressures as little as 0.005 psi.

2. Discussion of the Related Art

The pressure of a liquid or gas is defined as the force the fluid exerts in a direction perpendicular to a surface of unit area. A distinction is made between "absolute pressure," which is measured with respect to a total vacuum, and "gauge pressure," which is the amount by which the pressure exceeds a reference pressure such as atmospheric pressure. Therefore, gauge pressure plus atmospheric or reference pressure is equal to absolute pressure.

There are many types of gauges which are used to measure fluid pressure. One form of pressure gauge is the U-gauge or U-tube manometer. As the name suggests, the U-tube manometer consists of a U-shaped tube which contains a predetermined amount of fluid such as water, mercury or sometimes a gas. The manometer may have each arm of the tube exposed to atmospheric pressure, or one arm may be sealed in which a vacuum exists between the sealed end and the fluid. The latter type of manometer may be used to detect or measure very low or vacuum pressures.

Referring back to the first or open manometer briefly mentioned above, one arm of the tube may be in fluid communication with a pressure source, $P_1$, and the other arm may be in fluid communication with a second pressure source, $P_2$, (oftentimes atmospheric pressure). When each arm is subject to the same pressure, $P_1$ equal to $P_2$, the height of the two fluid columns are equal. If the pressures exerted upon the fluid in each arm are different, $P_1$ unequal to $P_2$, the height of the fluid columns will be different: the lowest mercury column being the one experiencing the greater pressure. The height difference between the two fluid levels, together with a knowledge of manometer fluid density, can provide a measure of the pressure differential between the two arms of the manometer.

To determine the level differences between the two fluid columns, the U-tubes are typically manufactured from glass or transparent plastic. This way the fluid levels could be visually measured against gradations either etched in the arm or marked on a scale adjacent each arm. One disadvantage in using a glass or plastic manometer is accuracy. The height of the fluid column can only be measured to within a limit defined by the scale of the gradations. Secondly, the working fluid within the manometer tubing usually has a miniscus at the top of each column. The miniscus adds to the problem of accurately determining weight because the height of the column may not be interpreted consistently by different observers. Another disadvantage of a glass or plastic manometer is the range of static pressures at which it may be safely used. Static pressures on the order of 500 pounds per square inch (psi) may cause the tube to rupture.

In situations where the static pressure may exceed that permissible for a glass or plastic manometer, high-pressure vessels or tubing may be used. The vessels or tubes are commonly manufactured from steel or other high strength opaque materials where the height of the enclosed fluid columns cannot be visually determined. In the past, mechanical devices such as floats have been attached to dials or gauges. A major disadvantage to float-type detectors in each column is that the volumn of each float changes according to the static pressure in each column. This may lead to serious inaccuracies output at each gauge. Another disadvantage is that moving parts require maintenance.

One manometer consists of several upright tubes, each partially filled by a heavy liquid, in this case, brine. The remaining volumn of each column is filed with a gas. The tubes are in fluid communication with each other to exchange quantities of brine or gas. A diaphragm closing the bottom of each tube contains an acoustic transducer. Because the diaphragm is necessarily thin, a housing surrounding the diaphragm and transducer must be pressurized to prevent the diaphragm from sagging or rupturing under the pressure of the brine. As the pressures change in each tube, the height of the respective brine may be determined by measuring the two-way travel time of an acoustic pulse sent by the transducer and reflected from the top of the brine column back to the transducer. Periodically, the two-way travel time of the acoustic pulse to a target at a known distance is measured to provide a calibration for the manometer system. Herein lies one of the major disadvantages to the above system. The calibration targets used to determine the propagation velocity of the acoustic pulse through the brine are located near the top of each tube, well into the volume occupied by the gas. In order to calibrate the system, the gas must be displaced and the volume of brine increased in order to immerse the calibration targets. The two-way travel time is then measured between the transducer and calibration target. Once calibrated, the brine level must be lowered in order not to reflect a signal from both the top of the brine and the calibration target. The requirement to alter the system for the purpose of calibrating the acoustic pulse is inefficient thereby resulting in longer operational times and increased costs. An additional disadvantage is the initial cost of the complex plumbing used to transmit the different fluids between the different tubes.

SUMMARY OF THE INVENTION

It is a primary object of this invention to provide an improved apparatus for measuring or producing a differential pressure between two predetermined points.

It is yet another object of this invention to provide an apparatus for calibrating differential pressure transducers.

It is yet another object of this invention to provide an apparatus for measuring or producing small differential pressures, equal to or greater than 0.005 pounds per square inch differential (psid), under static pressures on the order of $1.0 \times 10^4$ psid.

The instant invention comprises a U-shaped tubular housing having a predetermined amount of high density working fluid therein and extending up each arm or column. The remaining upper volume of the tubular housing may contain a second fluid having a density substantially less than the working fluid. The top of each column may be sealed by a cap having an inlet-outlet port, and a transducer assembly immersed in the second fluid. The inlet-outlet port at the top of each column may receive a conduit coupled to a respective pressure source containing the second fluid. A calibration target located in each column at a predetermined distance away from each transducer, and immersed in the second fluid, is used to continually calibrate the system during use. Each pressure source exerts a static pressure conducted by the second fluid upon the column of working fluid in the housing. The pressure differential between the two sources results in an offset between the upper surfaces of the working fluid in each column. The height of the working fluid in each column may be determined by measuring the two-way travel time of an acoustic pulse generated by the transducer assembly and reflected from the interface of the working fluid and the second fluid. Simultaneously, the propagation velocity of the acoustic pulse may be calibrated from the portion of the acoustic pulse reflected by the calibration target. The reflected signals from the calibration target and the top of the working fluid are received by the transducer assembly and converted to an electrical signal which may be passed to a recording and processing unit. The recording and processing unit computes the height difference of the two working fluid levels. According to a predetermined program in the processing unit, the differential pressure may be determined and displayed.

BRIEF DESCRIPTION OF THE DRAWINGS

A better understanding of the benefits and advantages of my invention may be obtained from the appended detailed description and the drawings, wherein.

DETAILED DESCRIPTION OF THE PREFERRED EMBODIMENTS

Figure 1:
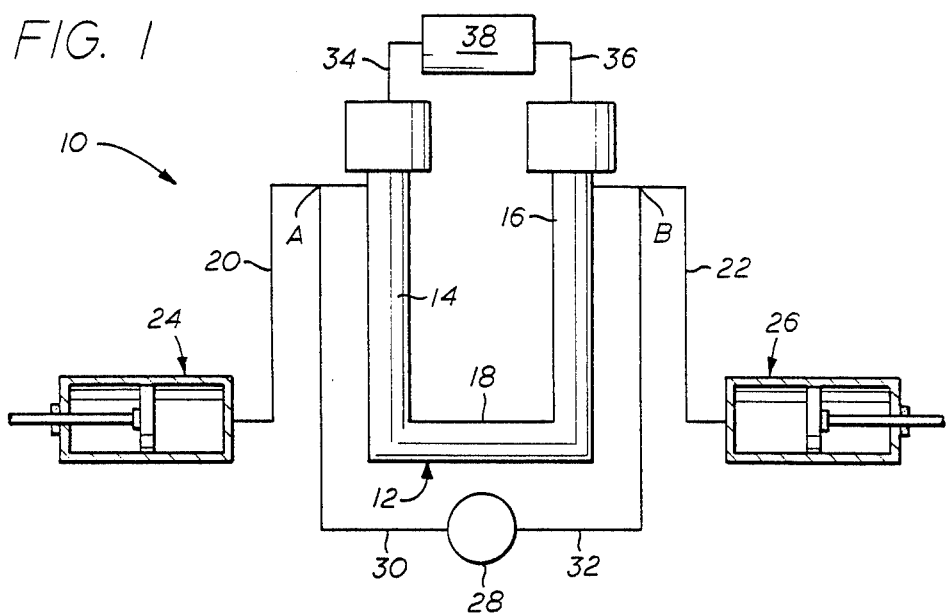
FIG. 1 is a generalized diagram of a high pressure system employing the instant invention.

Referring to the different Figures, like reference numerals indicate like components, wherein FIG. 1 is a generalized diagram of a high-pressure system 10 employing the instant invention. System 10 may be used to calibrate the gauge pressure sensed by a differential pressure detector or may be used to establish a pressure differential between two predetermined points in the system. In general, system 10 may be comprised of a high-pressure manometer 12 having a pair of tubular upright columns 14 and 16 in fluid communication with each other at a lower end by an interconnecting horizontal tube 18. The upper end of each column 14 and 16 may be in fluid communication through conduits 20 and 22 respectively, to a separate pressure source 24 and 26, such as a positive displacement pump. A differential pressure gauge or transducer 28 may be coupled to the system 10 by interconnecting pressure lines 30 and 32 to conduits 20 and 22 respectively. It is preferred, but not by way of limitation, that the pressure lines 30 and 32 be coupled to the conduit 20 and 22 at points A and B proximate each column 14 and 16. Between points A and B, a pressure difference between the two columns may be conveniently measured. Located within the top of each column may be a sensing unit (not shown in this figure) which may be operably coupled through appropriate conductors 34 and 36 to a remote processing unit 38. Processing unit 38 interprets and displays data produced by the system 10.

Figure 2:
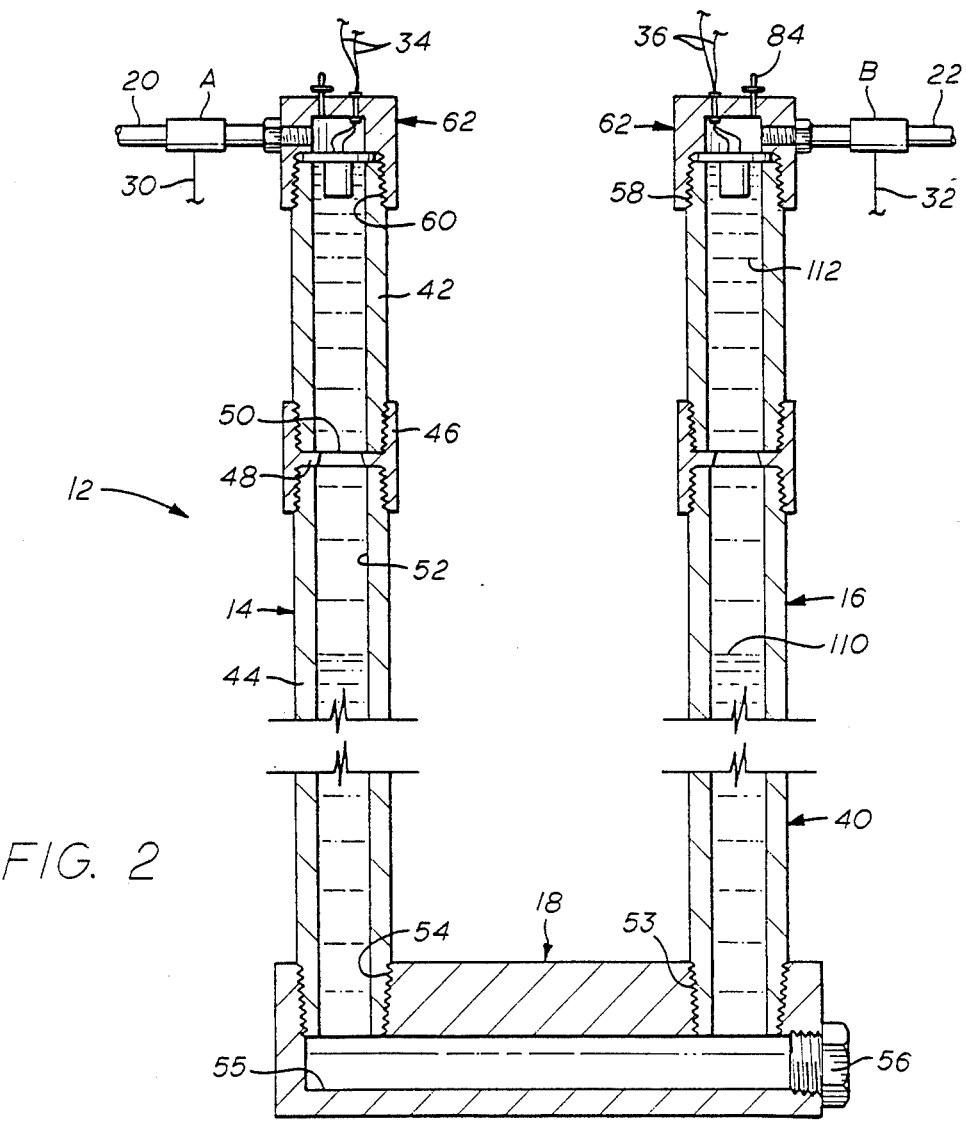
FIG. 2 is an elevational view in cross section of one embodiment of this invention.

FIG. 2 is an elevational view in cross section of one embodiment of the manometer shown in FIG. 1. Manometer 12 may have a U-shaped, tubular housing 40 comprised of a pair of upright tubular columns 14 and 16 interconnected to each other at a lower end by a horizontal column tube 18. Each vertical column such as 14 may be constructed of at least two tubular segments 42 and 44 interconnected in tandem with each other by way of a collar 46. Collar 46 may have an inner flange 48 that separates the two segments 42 and 44 and forms an annular shoulder 50 that protrudes from the inner wall 52 of the column. The length of tube 42 may be substantially equal to one-quarter of that of the column. The coupled tubular segments 42 and 44 comprising a column may be engaged by threads 53 to a socket 54 in the horizontal tube 18. Tube 18 shown in the Figure may essentially consist of solid metal stock having a longitudinal bore 55 substantially extending therethrough and intersecting the two sockets 54, which threadably receive the ends of columns 14 and 16. The longitudinal bore 55 may be sealed by a high pressure plug 56.

It is preferred that the joints between segments 42 and 44 and horizontal tube 18 be sufficiently tight and sealed so as to prevent the leaking of fluid therefrom under substantially high static pressure.

It shall be understood by those skilled in the art of manometers that in an alternate housing, a horizontal tube may be constructed of a predetermined length of tubing having elbow joints attached at each end to receive the columns. Both of the embodiments outlined above may be constructed from high-strength stainless steel or other high strength material.

Figure 3:
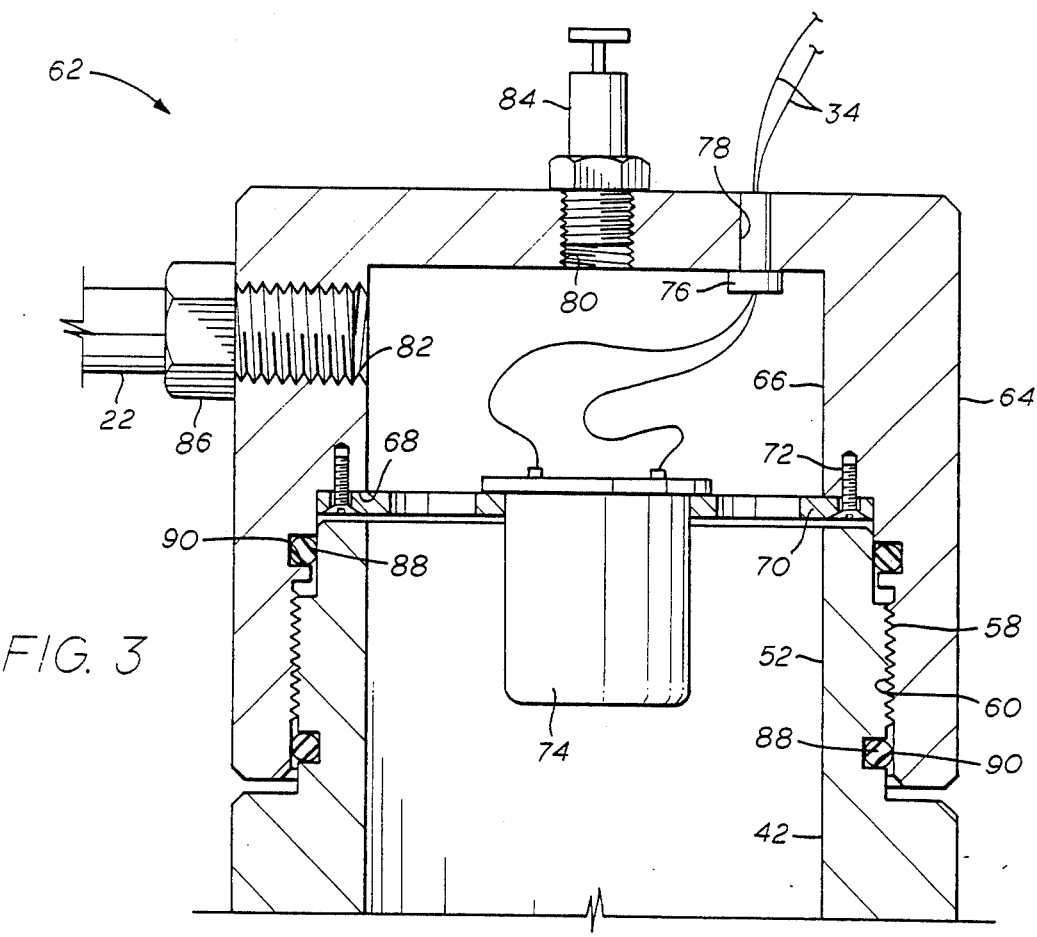
FIG. 3 is an enlarged elevational view in cross section of a cap assembly.

The top of each column 14 and 16 may be closed by a cap assembly 62. FIG. 3 is an enlarged elevational view of the cap assembly 62 shown in cross section. Cap assembly 62 may include a cap 64 having a longitudinal recess 66 concentric with the inner wall 52 of the upper tubular segment 42. The recess 66 may define a shoulder 68 above the end of the tubular segment 42 for receiving a mounting bracket 70. The mounting bracket 70 may be securely fastened to the cap 64 by screws 72 extending through the mounting bracket and into the shoulder 68. The mounting bracket may retain one, but preferrably two, lead-zirconate-titanate ultrasonic transducers 74 typically known as PZT-5A transducers and manufactured by a number of companies. Each transducer 74 may be operably coupled to a remote processing unit 38 by conductors 34 or 36 wrapped in a high-pressure seal 76 extending through a port 78 in the cap 64. Other ports 80 and 82 extending through the cap 64 receive a valve 84, and a high pressure fitting 86 coupling conduit 22 or 24 thereto, respectively. Cap 64 may form a tight seal with the top of each column by way of O-ring seals 88 retained by annular channels 90 on each side of the threads.

Figure 4:
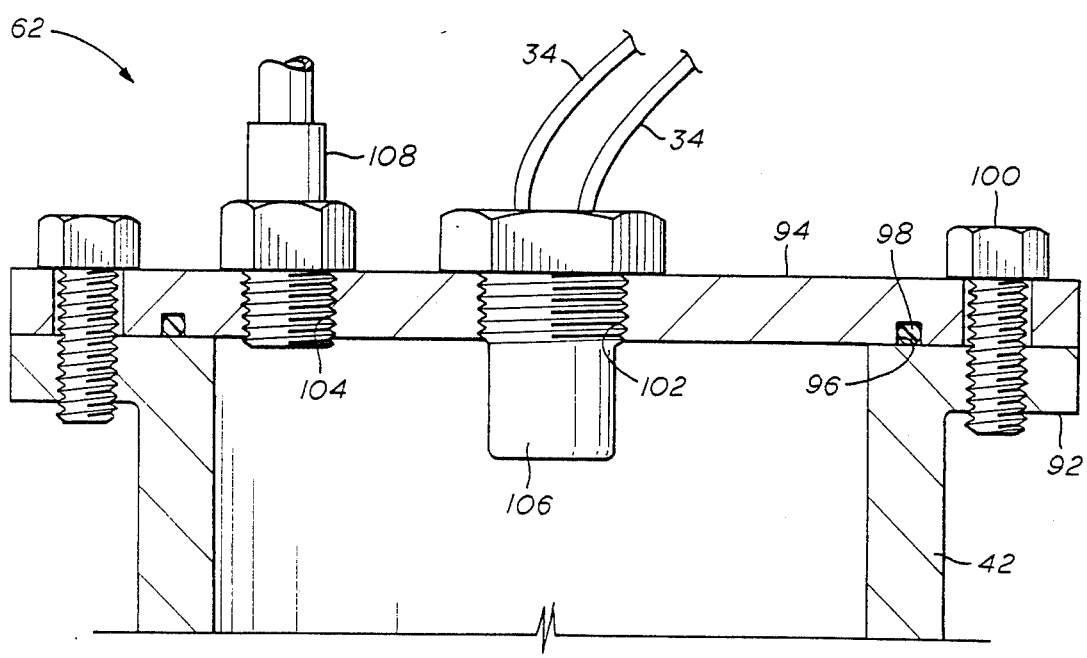
FIG. 4 is an alternate embodiment of a cap assembly.

In another embodiment of this invention, the cap assembly 62 shown in FIG. 3 may be replaced by an end-plate arrangement shown in FIG. 4. In this alternate embodiment, the upper ends of the upper segments 42 may be flanged and have a plurality of holes extending therethrough. A matching end-plate 94, having an O-ring groove 96 and O-ring 98, may be fastened to the end of each column by way of bolts 100. The end plate 94 may have ports 102 and 104 extending therethrough for receiving a transducer unit 106 and high-pressure fitting 108. The transducer unit 106 may contain the PZT-5A transducers mentioned above.

It should be understood that essentially any cap assembly may be used to seal the top of each column and anchor the transducers at the top thereof.

Refer again to FIG. 2. Each column 14 and 16 is partially filled with a high density working liquid such as mercury. The amount of mercury is such that the level in each column is located approximately midway up the height of the columns. In any event, the amount of mercury should not exceed the amount which, when the mercury level in one column is maximally depressed, the level of the other mercury column preferrably should not immerse the collar flange 48.

A second liquid 112 fills the remaining volume of each column above the mercury. It is preferred that the second liquid be an oil such as odorless kerosene. The kerosene is essentially non-reactive with mercury and less dense. The kerosene not only fills each column but is also contained in each conduit 20 and 22 and in each pressure source such as 24 and 26 shown in FIG. 1. It is preferred that gas pockets not be present in the manometer 12 and associated conduits or pressure sources. Any gas in the system may be allowed to escape through valve 84 or similar valves in the hydraulic system. Gases, because of their acoustic properties, could alter the data from this invention.

In operation, the pressure differential between the two pressure sources may be determined by measuring the height difference between the two mercury columns. For example, the first pressure source 24 may exert a pressure upon the kerosene which in turn exerts a force upon the top of the mercury in column 14. The second pressure source 26 may exert a pressure upon the kerosene which in turn may exert its force upon the level of the mercury in column 16. Unequal pressures from the two pressure sources will result in unequal levels of mercury in each column. The levels of the two mercury columns may be determined by generating an acoustic pulse by the transducer located at a know point in the top of each column. Since the transmitting portion of the transducer is immersed in the kerosene, the acoustic pulse readily enters and propagates down the column of kerosene. A portion of the propagating pulse may impinge upon the shoulder of the flange 48 and may be reflected back to the transducer where it is detected. The remaining portion of the acoustic pulse may be reflected from the top of the mercury in each column and reflected back to the transducers. The distance from the transducer to the flange 48 should be known and the two-way travel time may be determined by the remote processing unit coupled to the transducers. Thus, the first signal received by the transducers is the signal reflected from the calibration target which is located at a precisely known distance from the acoustic transducer. The second pulse received is the signal reflected from the top of the mercury. Since the distance to the calibration target is known, the two-way travel time for the arrival of the first signal in each column provides the propagation velocity of the acoustic pulse in the oil. This configuration of calibration targets provides precise calibration data with each measurement of working fluid heights. The two-way travel time of the second received signal in each column is input with the calculated propagation velocity into a predetermined program within the remote processing unit which calculates the differential pressure based upon the height differential of the mercury columns.

A differential pressure transducer may be calibrated using this invention employing essentially the same procedure as above. The differential pressure transducer may be interconnected to the system as outlined in the discussion of FIG. 1. The pressure differential determined by the remote processing unit may be compared to the gauge differential pressure.

For illustrative purposes, my invention has been described with a certain degree of specificity. Variations will occur to those skilled in the art but which may be included within the scope and spirit of this invention which is limited only by the appended claims:

I claim as my invention:

1. An apparatus for determining a pressure differential between a first and a second pressure source, comprising:
   (a) a U-shaped tubular housing defining a first and a second upright tubular column in fluid communication through an upper end with said first and second pressure source, respectively;
   (b) a first fluid within said housing filling each column to a predetermined reference level, the fluid defining an acoustically reflective surface;
   (c) means at said upper end of each column for acoustically measuring the height of said acoustically reflective surface relative to said predetermined reference level; and
   (d) means interconnected to each acoustically measuring means, for calculating said pressure differential between said first and second pressure source according to a difference in the height of said acoustically reflective surface in each column.

2. An apparatus as recited in claim 1, further comprising:
   (a) a second fluid, having a density substantially less than said first fluid, filling a remaining volume of each column above said first fluid, and supplied under a first and second pressure from said first and second pressure source, respectively; and
   (b) means, integral with said acoustically measuring means, for determining a propagation velocity of an acoustic signal on said second fluid.

3. An apparatus as recited in claim 2, wherein said means for acoustically measuring the height of said acoustically reflective surface comprises:
   (a) means for generating an acoustic signal within said second fluid, whereby said acoustic signal propagates down each column and is reflected from said acoustically reflective surface; and
   (b) means, integral with said generating means for detecting said acoustic signal reflected from said acoustically reflective surface.

4. An apparatus as defined by claim 3, wherein said means for generating an acoustic signal comprises a transducer.

5. An apparatus as defined by claim 3, wherein said means for detecting said acoustic signal comprises a transducer.

6. An apparatus as defined in claim 2, wherein said means for determining a propagation velocity of an acoustic signal in said second fluid comprises means, located within each column at a predetermined distance between said acoustically measuring means and said acoustically reflective surface, for reflecting a predetermined portion of said acoustic signal back to said acoustically measuring means.

7. An apparatus as recited in claim 2, wherein said means for calculating said pressure differential comprises a remote processing means.

8. An apparatus for calibrating an output of a differential pressure transducer interconnected to a first and a second pressure source, comprising:
   (a) a U-shaped housing defining a first and a second upright tubular column in fluid communication through an upper end with said first and second pressure source, respectively;
   (b) a first fluid within said housing and partially filling each column, said first fluid in each column defining an acoustic reflector along its upper surface;
   (c) means, in said upper end of each column for acoustically determining a distance between said upper end and said acoustic reflector;
   (d) means, operably interconnecting said means for acoustically determining a distance, for calculating said differential pressure according to a predetermined program based on a difference in the distance between said upper end and said acoustic reflector in each column, whereby said output of said differential pressure transducer may be compared with an output from said means for calculating said differential pressure.

9. An apparatus as recited in claim 8, further comprising:
   (a) second fluid, having a density substantially less than said first fluid, filling a remaining volume of each column above said first fluid, and under a first and a second pressure from said first and second pressure source, respectively.

10. An apparatus as recited by claim 9, further comprising means, integral with said means for acoustically determining a distance for establishing a propagation velocity of an acoustic signal propagating through said second fluid.

11. The apparatus as recited by claim 10, wherein said means for establishing a propagation velocity of an acoustic signal propagating through said second fluid comprises means disposed within each column at a predetermined distance from said means for acoustically determining a distance and above said first fluid, for reflecting a predetermined portion of said acoustic signal back to said means for acoustically determining a distance.

12. The apparatus as recited by claim 9, wherein said second fluid is not a gas.

13. The apparatus as recited by claim 9, wherein said means for acoustically determining a distance between said upper end and said acoustic reflector comprises:
   (a) means for generating an acoustic signal; and
   (b) means for detecting an acoustic signal.

14. The apparatus as recited in claim 13, wherein said means for generating an acoustic signal, and said means for detecting an acoustic signal comprises a piezoelectric transducer.

* * * * *